US012612949B2

(12) United States Patent
Baker et al.

(10) Patent No.: US 12,612,949 B2
(45) Date of Patent: *Apr. 28, 2026

(54) CENTRIFUGAL CLUTCH MECHANISMS

(71) Applicant: Techtronic Cordless GP, Anderson, SC (US)

(72) Inventors: David Baker, Easley, SC (US); Frank Peters, Easley, SC (US)

(73) Assignee: TECHTRONIC CORDLESS GP, Anderson, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/952,343

(22) Filed: Nov. 19, 2024

(65) Prior Publication Data

US 2025/0075751 A1     Mar. 6, 2025

Related U.S. Application Data

(63) Continuation of application No. 18/351,098, filed on Jul. 12, 2023, now Pat. No. 12,253,125.

(60) Provisional application No. 63/425,774, filed on Nov. 16, 2022, provisional application No. 63/393,543, filed on Jul. 29, 2022.

(51) Int. Cl.
*F16D 43/16* (2006.01)
*A01D 34/68* (2006.01)
*A01D 101/00* (2006.01)

(52) U.S. Cl.
CPC ......... *F16D 43/16* (2013.01); *A01D 34/6812* (2013.01); *A01D 2101/00* (2013.01)

(58) Field of Classification Search
CPC ......... F16D 43/14–18; F16H 48/12–19; A01D 34/6812
See application file for complete search history.

(56) References Cited

U.S. PATENT DOCUMENTS

| | | | |
|---|---|---|---|
| 688,644 A | 12/1901 | Houghtaling |
| 2,854,865 A | 10/1958 | Rodgers |
| 4,205,737 A | 6/1980 | Harkness et al. |
| 4,316,355 A | 2/1982 | Hoff |
| 4,369,737 A | 1/1983 | Sanders |
| 7,152,704 B2 | 12/2006 | Uemura et al. |

(Continued)

FOREIGN PATENT DOCUMENTS

| | | |
|---|---|---|
| CN | 101016924 A | 8/2007 |
| CN | 201188770 Y | 2/2009 |

(Continued)

*Primary Examiner* — James J Taylor, II
(74) *Attorney, Agent, or Firm* — Dority & Manning, P.A.

(57) ABSTRACT

Centrifugal clutch mechanisms, and transmissions and lawnmowers having centrifugal clutch mechanisms are provided. A centrifugal clutch mechanism includes a clutch bell comprising an annular wall and a circular ring extending away from the annular wall to define an internal cavity, wherein the circular ring comprises an inward facing surface defining a drive surface. The centrifugal clutch mechanism also includes a plurality of centrifugal weights disposed in the internal cavity and an inward biasing element engaged with the centrifugal weights. The inward biasing element biases the centrifugal weights towards a disengaged position in which the centrifugal weights do not interface with drive surface, and upon application of a sufficient centrifugal force, the centrifugal weights are configured to transition to an engaged position in which the centrifugal weights interface with the drive surface.

17 Claims, 9 Drawing Sheets

(56) References Cited

U.S. PATENT DOCUMENTS

| | | | |
|---|---|---|---|
| 7,555,968 | B2 | 7/2009 | Blanchard |
| 7,641,580 | B2 | 1/2010 | Blanchard |
| 7,665,589 | B2 | 2/2010 | Blanchard |
| 7,669,702 | B2 | 3/2010 | Blanchard |
| 8,357,066 | B2 | 1/2013 | Lee et al. |
| 9,599,170 | B1 | 3/2017 | Hauser et al. |
| 9,759,300 | B2 | 9/2017 | Barendrecht |
| 9,807,928 | B1 | 11/2017 | Stout |
| 9,856,930 | B2 | 1/2018 | Heath et al. |
| 10,130,031 | B2 | 11/2018 | Yoshimura et al. |
| 10,271,476 | B2 | 4/2019 | Yoshimura et al. |
| 10,479,187 | B2 | 11/2019 | Lubben et al. |
| 10,645,878 | B2 | 5/2020 | Zhang et al. |
| 10,842,078 | B1 | 11/2020 | Goings |
| 10,933,731 | B2 | 3/2021 | Fliearman et al. |
| 10,975,937 | B2 | 4/2021 | Fliearman et al. |
| 10,980,180 | B2 | 4/2021 | Zhang et al. |
| 11,032,962 | B2 | 6/2021 | Ho et al. |
| 11,181,180 | B2 | 11/2021 | Matsumoto |
| 11,248,680 | B2 | 2/2022 | Noonan et al. |
| 2008/0121489 | A1 | 5/2008 | Chevalier |
| 2010/0192532 | A1 | 8/2010 | Slater et al. |
| 2010/0199623 | A1 | 8/2010 | Akahane |
| 2012/0031066 | A1 | 2/2012 | Neudorf et al. |
| 2015/0090056 | A1 | 4/2015 | Brenninger |
| 2015/0245559 | A1 | 9/2015 | Yang |
| 2019/0387670 | A1 | 12/2019 | Matsuda et al. |
| 2020/0253114 | A1 | 8/2020 | Yan |
| 2020/0375102 | A1 | 12/2020 | Arendt et al. |
| 2020/0393019 | A1 | 12/2020 | Matsunaga et al. |
| 2020/0404848 | A1 | 12/2020 | Kuriyagawa et al. |
| 2020/0406885 | A1 | 12/2020 | Kuriyagawa et al. |
| 2021/0008979 | A1 | 1/2021 | Bindle et al. |
| 2021/0137011 | A1 | 5/2021 | Dong et al. |
| 2021/0219490 | A1 | 7/2021 | Teillet et al. |
| 2021/0291917 | A1 | 9/2021 | Eckberg |
| 2021/0400878 | A1 | 12/2021 | Vines et al. |
| 2022/0071096 | A1 | 3/2022 | Zhu et al. |
| 2022/0104424 | A1 | 4/2022 | Marquardt |
| 2022/0117155 | A1 | 4/2022 | Kippes et al. |
| 2022/0186793 | A1 | 6/2022 | Guiroult |
| 2022/0338412 | A1 | 10/2022 | Nonaka et al. |
| 2023/0272840 | A1 | 8/2023 | Bray |

FOREIGN PATENT DOCUMENTS

| | | | |
|---|---|---|---|
| CN | 203226030 | U | 10/2013 |
| CN | 102783307 | B | 8/2014 |
| CN | 204168762 | U | 2/2015 |
| CN | 104322202 | B | 1/2016 |
| CN | 205179748 | U | 2/2016 |
| CN | 205249830 | U | 5/2016 |
| CN | 205510937 | U | 8/2016 |
| CN | 105940869 | A | 9/2016 |
| CN | 205694373 | U | 11/2016 |
| CN | 205694374 | U | 11/2016 |
| CN | 205727115 | U | 11/2016 |
| CN | 205902413 | U | 1/2017 |
| CN | 107791805 | A | 3/2018 |
| CN | 207594712 | U | 7/2018 |
| CN | 207836177 | U | 9/2018 |
| CN | 103875366 | B | 3/2019 |
| CN | 109756068 | A | 5/2019 |
| CN | 110073816 | A | 8/2019 |
| CN | 110214539 | A | 9/2019 |
| CN | 110273934 | A | 9/2019 |
| CN | 110273935 | A | 9/2019 |
| CN | 110278776 | A | 9/2019 |
| CN | 209462178 | U | 10/2019 |
| CN | 209676869 | U | 11/2019 |
| CN | 110525207 | A | 12/2019 |
| CN | 110701282 | A | 1/2020 |
| CN | 210094001 | U | 2/2020 |
| CN | 111034453 | A | 4/2020 |
| CN | 210470312 | U | 5/2020 |
| CN | 111225556 | A | 6/2020 |
| CN | 210868832 | U | 6/2020 |
| CN | 107371567 | B | 7/2020 |
| CN | 210928688 | U | 7/2020 |
| CN | 211335579 | U | 8/2020 |
| CN | 111615932 | A | 9/2020 |
| CN | 111837592 | A | 10/2020 |
| CN | 211702998 | U | 10/2020 |
| CN | 211721118 | U | 10/2020 |
| CN | 211721120 | U | 10/2020 |
| CN | 211721154 | U | 10/2020 |
| CN | 111937567 | A | 11/2020 |
| CN | 112088655 | A | 12/2020 |
| CN | 212297340 | U | 1/2021 |
| CN | 212413891 | U | 1/2021 |
| CN | 112405571 | A | 2/2021 |
| CN | 212436380 | U | 2/2021 |
| CN | 212588944 | U | 2/2021 |
| CN | 212677803 | U | 3/2021 |
| CN | 112606682 | A | 4/2021 |
| CN | 112753295 | A | 5/2021 |
| CN | 113002296 | A | 6/2021 |
| CN | 213523122 | U | 6/2021 |
| CN | 213784250 | U | 7/2021 |
| CN | 214070688 | U | 8/2021 |
| CN | 113364204 | A | 9/2021 |
| CN | 113417981 | A | 9/2021 |
| CN | 214508004 | U | 10/2021 |
| CN | 214628222 | U | 11/2021 |
| CN | 214757693 | U | 11/2021 |
| CN | 214757694 | U | 11/2021 |
| CN | 214757976 | U | 11/2021 |
| CN | 215011736 | U | 12/2021 |
| CN | 113875544 | A | 1/2022 |
| CN | 215452697 | U | 1/2022 |
| CN | 215567681 | U | 1/2022 |
| CN | 215806191 | U | 2/2022 |
| CN | 216123522 | U | 3/2022 |
| DE | 20204703 | U1 | 8/2002 |
| DE | 202005016036 | U1 | 12/2005 |
| DE | 102018112997 | A1 | 12/2019 |
| EP | 0981944 | A1 | 3/2000 |
| EP | 1198981 | A3 | 4/2002 |
| EP | 1558069 | B1 | 8/2005 |
| EP | 1597956 | A1 | 11/2005 |
| EP | 3506730 | A4 | 7/2019 |
| EP | 3901004 | A1 | 10/2021 |
| FR | 2867534 | B1 | 11/2007 |
| FR | 2889276 | B1 | 11/2007 |
| GB | 2179718 | B | 5/1990 |
| JP | 3142661 | U | 6/2008 |
| WO | WO2021008759 | A1 | 1/2021 |
| WO | WO2021036033 | A1 | 3/2021 |
| WO | WO2021186118 | A1 | 9/2021 |

CENTRIFUGAL CLUTCH MECHANISMS

CROSS-REFERENCE TO RELATED APPLICATIONS

The present application claims priority to U.S. patent application Ser. No. 18/351,098, filed on Jul. 12, 2023 and which claims priority to U.S. Provisional Patent Application No. 63/393,543 filed on Jul. 29, 2022 and U.S. Provisional Patent Application No. 63/425,774 filed on Nov. 16, 2022, the disclosures of both of which are incorporated by reference herein in their entireties.

FIELD

The present disclosure relates generally to centrifugal clutch mechanisms and transmissions and lawnmowers with centrifugal clutch mechanisms.

BACKGROUND

Typically, prime movers such as motors and engines are connected to output shafts of machines through one or more meshing interfaces which selectively transmit power from the prime mover to the output shaft. These meshing interfaces allow the prime mover to selectively propel the machine. For example, meshing interfaces between one or more driving motors and one or more wheels of a lawnmower may allow an operator to selectively drive the wheels of the lawnmower. Similarly, meshing interfaces between one or more driving motors and one or more cutting blades of the lawnmower may allow the operator to selectively drive the cutting blades.

Meshing interfaces typically utilize a user engageable element which allows a user to directly or indirectly affect the interface. For instance, a clutch fork or other user engageable element may allow the operator to selectively engage and disengage the clutch mechanism. These types of interfaces allow the operator to engage the meshing interface. However, these interfaces require user input to operate.

Accordingly, improved transmissions and clutch mechanisms are desired in the art. In particular, transmissions and clutch mechanisms which provide simple, cost effective, space-efficient operation would be advantageous.

BRIEF DESCRIPTION

Aspects and advantages of the invention in accordance with the present disclosure will be set forth in part in the following description, or may be obvious from the description, or may be learned through practice of the technology.

In accordance with one embodiment, a transmission is provided. The transmission includes a first stage gear; a second stage gear; a centrifugal clutch mechanism that transfers energy from the first stage gear to the second stage gear. The centrifugal clutch mechanism includes a clutch bell having an annular wall and a circular ring extending away from the annular wall towards the first stage gear to define an internal cavity, wherein the circular ring comprises an inward facing surface defining a drive surface; and one or more centrifugal weights disposed in the internal cavity between the annular wall and the first stage gear, wherein the one or more centrifugal weights are slidingly engaged with the first stage gear; wherein the second stage gear is rotatably coupled to the clutch bell; and wherein rotation of the first stage gear causes the one or more centrifugal weights to transition from a disengaged position in which the one or more centrifugal weights do not interface with drive surface to an engaged position in which the one or more centrifugal weights interface with the drive surface to transfer rotational energy from the first stage gear to the second stage gear.

In accordance with another embodiment, a centrifugal clutch mechanism is provided. The centrifugal clutch mechanism includes a clutch bell comprising an annular wall and a circular ring extending away from the annular wall to define an internal cavity, wherein the circular ring comprises an inward facing surface defining a drive surface. The centrifugal clutch mechanism also includes a plurality of centrifugal weights disposed in the internal cavity and an inward biasing element engaged with the centrifugal weights, wherein the inward biasing element biases the centrifugal weights towards a disengaged position in which the centrifugal weights do not interface with drive surface, and wherein upon application of a sufficient centrifugal force, the centrifugal weights are configured to transition to an engaged position in which the centrifugal weights interface with the drive surface.

In accordance with another embodiment, a lawnmower is provided. The lawnmower includes a motor; a first stage gear operably coupled to the motor; a second stage gear; a plurality of wheels operably coupled to the second stage gear via an axle; and a centrifugal clutch mechanism that transfers energy from the first stage gear to the second stage gear. The centrifugal clutch mechanism includes a clutch bell comprising an annular wall and a circular ring extending away from the annular wall towards the first stage gear to define an internal cavity, wherein the circular ring comprises an inward facing surface defining a drive surface. The clutch mechanism also includes one or more centrifugal weights disposed in the internal cavity between the annular wall and the first stage gear, wherein the one or more centrifugal weights are slidingly engaged with the first stage gear; wherein the second stage gear is rotatably coupled to the clutch bell; and wherein rotation of the first stage gear by the motor causes the one or more centrifugal weights to transition from a disengaged position in which the one or more centrifugal weights do not interface with drive surface to an engaged position in which the one or more centrifugal weights interface with the drive surface to transfer rotational energy from the first stage gear to the second stage gear.

These and other features, aspects and advantages of the present invention will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present invention, including the best mode of making and using the present systems and methods, directed to one of ordinary skill in the art, is set forth in the specification, which makes reference to the appended figures, in which.

DETAILED DESCRIPTION

Figures 1, 2:
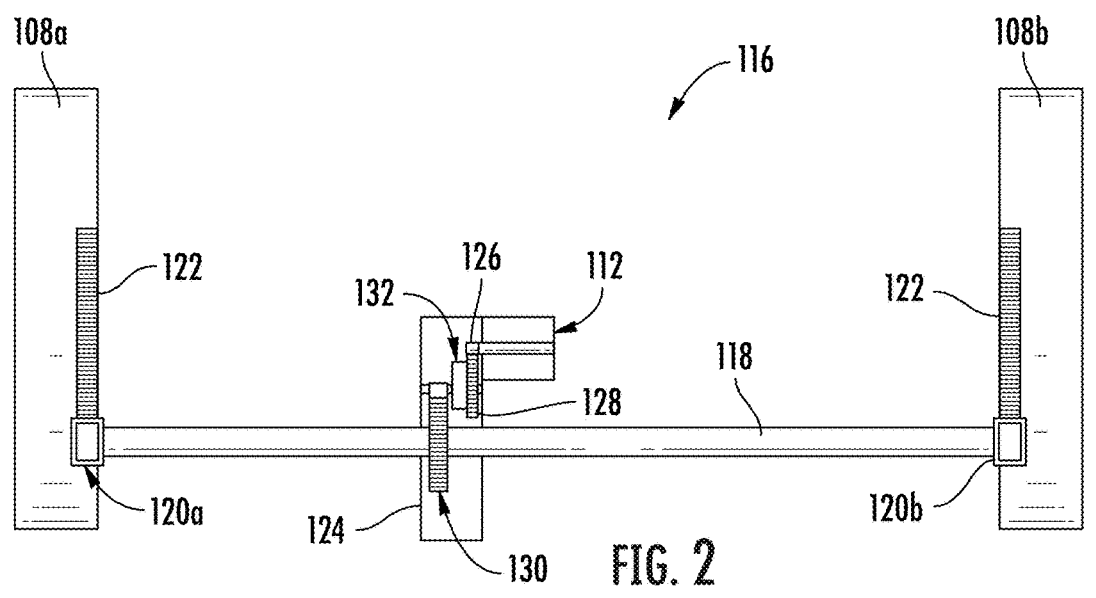
FIG. 1 is a perspective view of a lawnmower in accordance with embodiments of the present disclosure.
FIG. 2 is a schematic view of a drive system of the lawnmower in accordance with embodiments of the present disclosure.

Reference now will be made in detail to embodiments of the present invention, one or more examples of which are illustrated in the drawings. The word "exemplary" is used herein to mean "serving as an example, instance, or illustration." Any implementation described herein as "exemplary" is not necessarily to be construed as preferred or advantageous over other implementations. Moreover, each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components. The singular forms "a," "an," and "the" include plural references unless the context clearly dictates otherwise. The terms "operably coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive- or and not to an exclusive- or. For example, a condition A or B is satisfied by any one of the following: A is true (or present) and B is false (or not present), A is false (or not present) and B is true (or present), and both A and B are true (or present).

Terms of approximation, such as "about," "generally," "approximately," or "substantially," include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Benefits, other advantages, and solutions to problems are described below with regard to specific embodiments. However, the benefits, advantages, solutions to problems, and any feature(s) that may cause any benefit, advantage, or solution to occur or become more pronounced are not to be construed as a critical, required, or essential feature of any or all the claims.

In general, clutch mechanisms and machines using clutch mechanisms described herein operate using centrifugal force to rotate centrifugal weights between a disengaged position and an engaged position. The centrifugal weights of the centrifugal clutch mechanism can transition from the disengaged position to the engaged position dependent on imparted centrifugal force. In the engaged position, the centrifugal weights interface with one or more drive surfaces of a clutch bell to transmit power from the first stage gear to a second stage gear, e.g., from an input gear interfaced with the clutch mechanism to an output gear interfaced with the clutch mechanism. In the disengaged position, the centrifugal weights do not interface with the drive surfaces and power is not transmitted from the first stage gear to the second stage gear.

Thus, in operation, the centrifugal weights can start to rotate when the first stage gear, to which the centrifugal weights are partially coupled, reaches a threshold rotational speed. At and above the threshold rotational speed, the centripetal force of rotation can cause the centrifugal weights to move outwardly towards the drive surface. At a threshold rotational speed, the centrifugal weights can interface with the drive surfaces of the central shaft to drive the central shaft. The central shaft is coupled to an output. Accordingly, driven rotation of the central shaft by the centrifugal weights can transmit power from the first stage gear to the second stage gear.

Referring now to the drawings, FIG. 1 illustrates a lawnmower 100 in accordance with an exemplary embodiment of the present disclosure. The lawnmower 100 generally includes a body 102, a handle 104 extending from the body 102 to allow an operator to push or control the lawnmower 100, a bagging unit 106 coupled with the body 102 and configured to collect debris and clippings ejected from a mowing area of the body 102 when the lawnmower 100 is in use, and a plurality of walking elements in the form of, e.g., wheels 108. The lawnmower 100 further includes a battery storage area 110 configured to receive one or more batteries (not illustrated) and a prime mover, such as a motor 112 (FIG. 2), which drives the wheels 108. The lawnmower 100 can further include a deck height adjustment assembly 114 which allows the operator to control a height of cut. The deck height adjustment assembly 114 may be adjustable through an interface located at the handle 104. While the lawnmower 100 depicted in FIG. 1 is a walking mower (i.e., an operator walks behind the mower to control the mower), in one or more other embodiments, the lawnmower 100 can include a riding lawnmower or even another type of equipment, such as, e.g., a tractor, a snow thrower, an edger, or the like. While the following description relates to control of a driving aspect of the lawnmower 100, i.e., the described embodiment transmits powers from the motor 112 to the wheels 108, in other embodiments the described system can affect control of a different aspect of the machine, e.g., a selective power transmitter between a motor and a cutting blade, auger, or the like.

FIG. 2 illustrates a schematic view of an exemplary drive system 116 of the lawnmower 100 which transmits power from the motor 112 to opposite wheels 108a and 108b. The wheels 108a and 108b can be, for example, left and right rear wheels of the lawnmower 100. The wheels 108a and 108b can be interfaced with an axle 118 through gears 120a and 120b. The gears 120a and 120b can interface with a wheel gear 122 of each one of the wheels 108a and 108b. Thus, as the axle 118 rotates, the wheels 108a and 108b can be driven by the gears 120a and 120b through the wheel gears 122. In an embodiment, the gears 120a and 120b can be uni-directional gears, e.g., sprag gears, which enable the operator to overrun the lawnmower 100. Overrun is a condition whereby the speed of the lawnmower 100 exceeds a drive speed propelled by the motor 112. For instance, by way of non-limiting example, the motor 112 may be operating at 3 miles per hour. When the operator pushes the lawnmower 100 to increase speed past the operating speed of 3 miles per hour, the gears 120a and 120b can allow the lawnmower 100 to overrun whereby the operator can affect a higher operational speed. The uni-directional gearing may also enable the operator to turn the lawnmower 100 without requiring adjustment of the operating speed or any internal gearing.

Figure 3A:
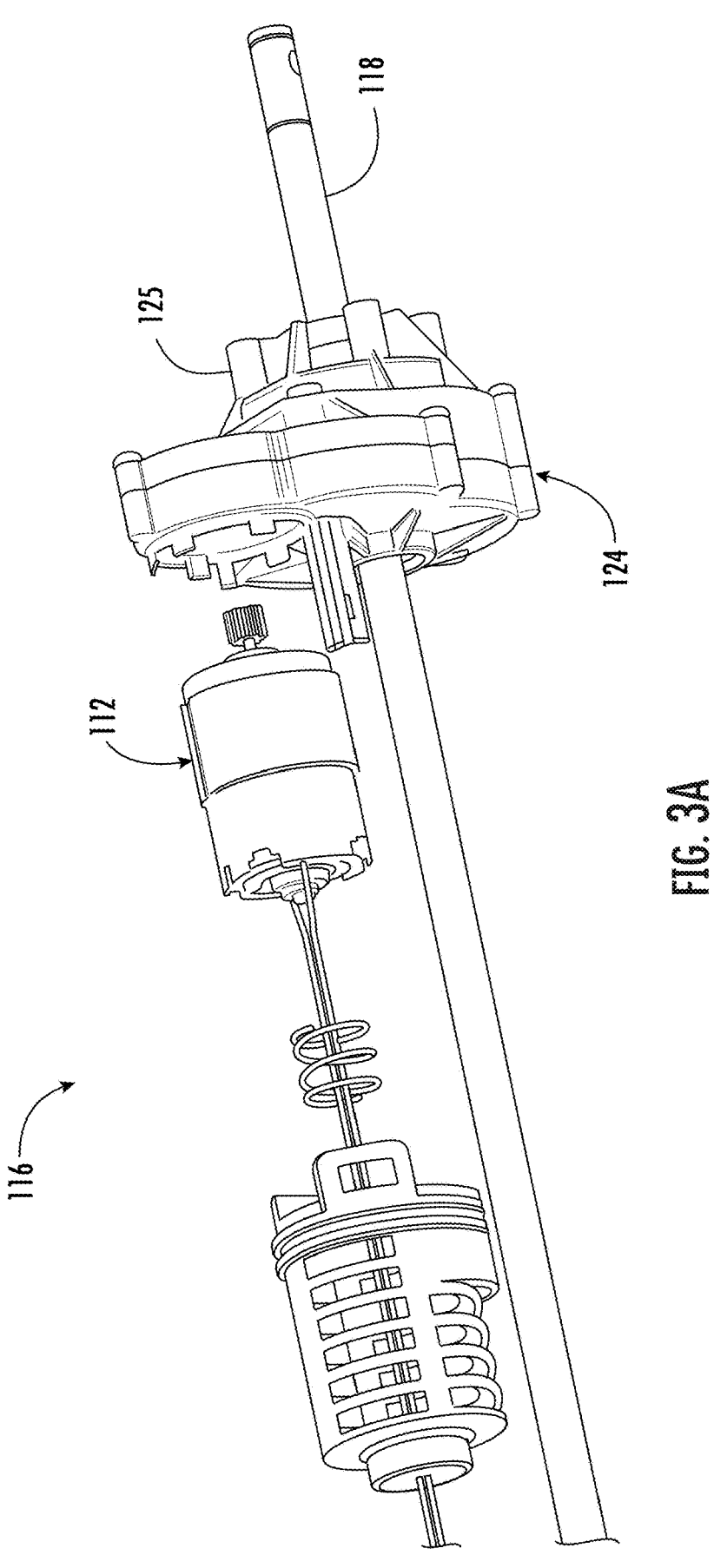
FIG. 3A is a perspective view of part of a drive system of the lawnmower in accordance with embodiments of the present disclosure.
Figure 3B:
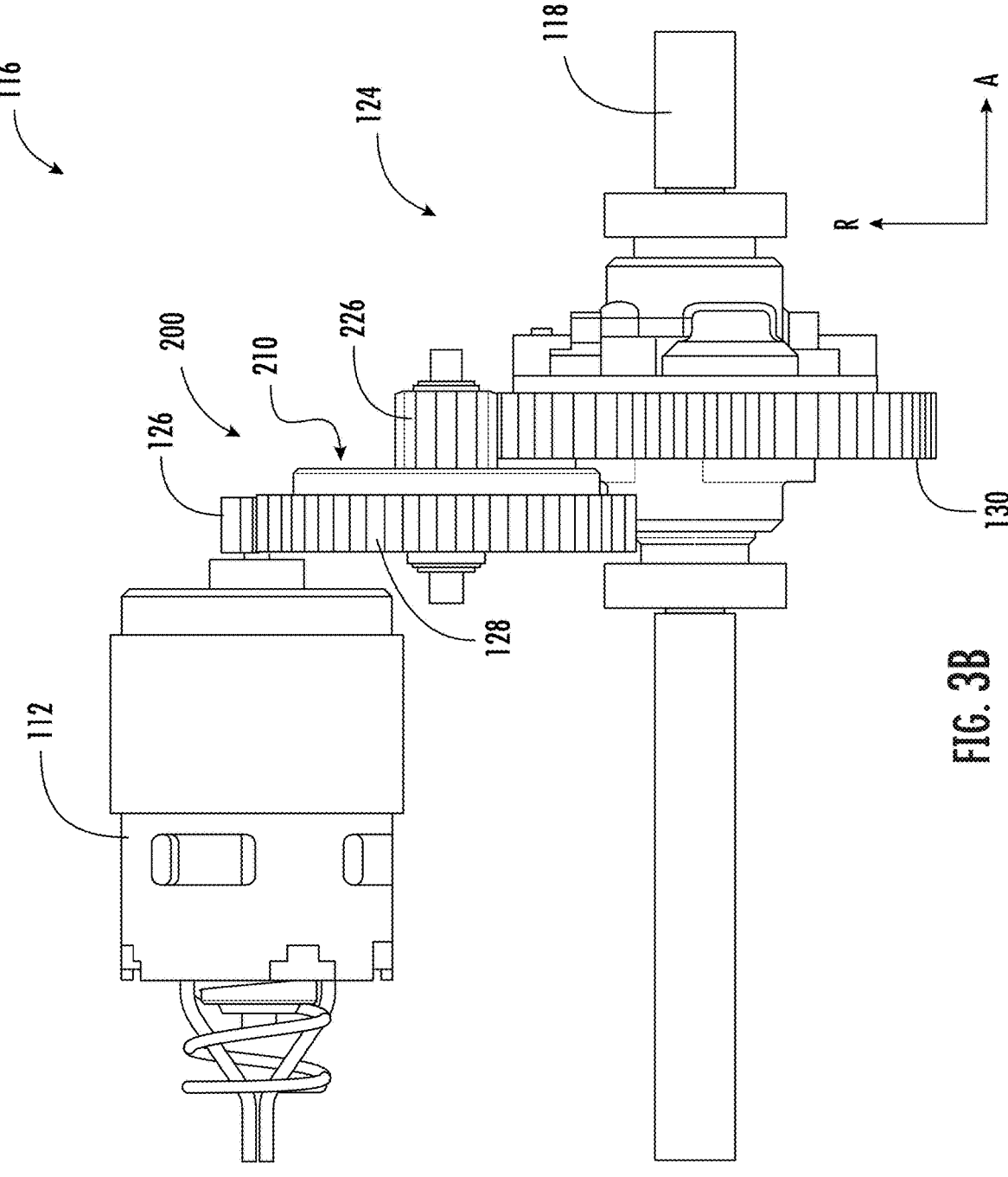
FIG. 3B is a front view of the drive system of FIG. 3A in accordance with embodiments of the present disclosure.
Figure 3C:
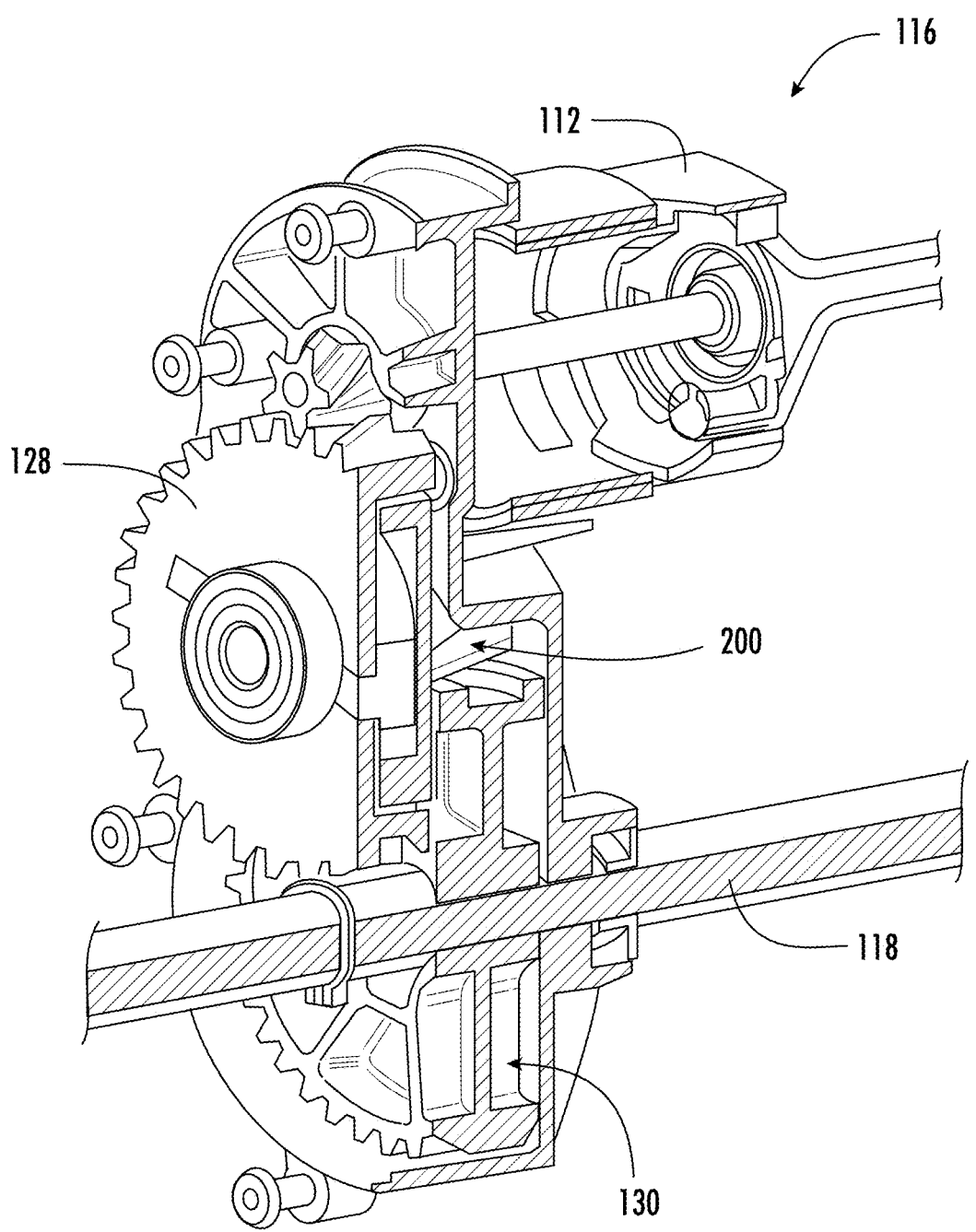
FIG. 3C is a cross sectional view of the drive system of FIG. 3B in accordance with embodiments of the present disclosure.

FIGS. 3A through 3C illustrate additional views of the drive system 116 schematically illustrated in FIG. 2. FIG. 3A illustrates a perspective view of a drive system 116 including a transmission 124 with a housing 125. FIG. 3B illustrates a front view of the drive system 116 from FIG. 3A with the housing 125 removed. FIG. 3C illustrates a cross sectional view of the drive system 116 of FIG. 3B.

As illustrated in FIGS. 2 and 3A-3C, the lawnmower 100 can further include the transmission 124 which converts power from a motor pinion 126 of the motor 112 to the axle 118. The transmission 124 can include, for instance, a first stage gear 128 in communication with the motor pinion 126 of the motor 112 and a second stage gear 130 in communication with the axle 118. The first stage gear 128 can also be referred to as an input for receiving power from the motor 112. The second stage gear 130 can also be referred to as an output for ultimately transferring the power from the motor 112 to the axle 118.

A centrifugal clutch mechanism 200 is be disposed between the first stage gear 128 and the second stage gear 130 for selectively transmitting power from the first stage gear 128 to the second stage gear 130. In some instances, the centrifugal clutch mechanism 200 can be directly coupled with the motor pinion 126 of the motor 112. In such instances, the motor pinion 126 from the motor 112 can be referred to as the input.

When the motor 112 is operating at low speeds, i.e., below a low-speed threshold, the centrifugal clutch mechanism 200 may be disengaged such that power from the motor 112 is not transmitted from the first stage gear 128 to the second stage gear 130. As the motor 112 increases speed, the centrifugal clutch mechanism 200 may engage at, or around, the low-speed threshold to transmit power from the first stage gear 128 to the second stage gear 130. Power from the second stage gear 130 can then be transmitted to the wheels 108a and 108b through the axle 118 and gears 120a and 120b, respectively, to drive the wheels 108a and 108b.

Figure 4:
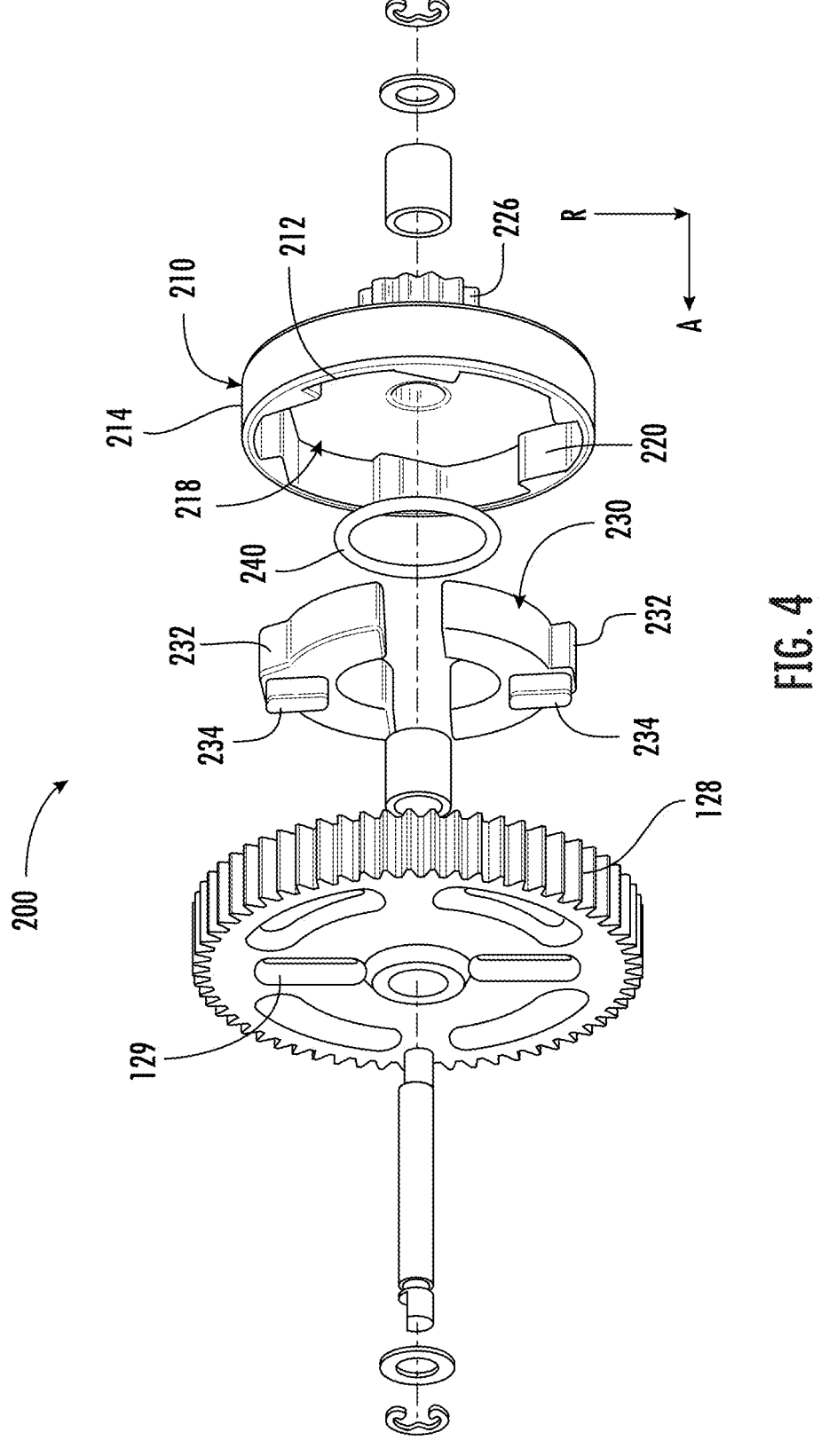
FIG. 4 is an exploded view of a centrifugal clutch mechanism of the drive system of the lawnmower in accordance with embodiments of the present disclosure.
Figure 5:
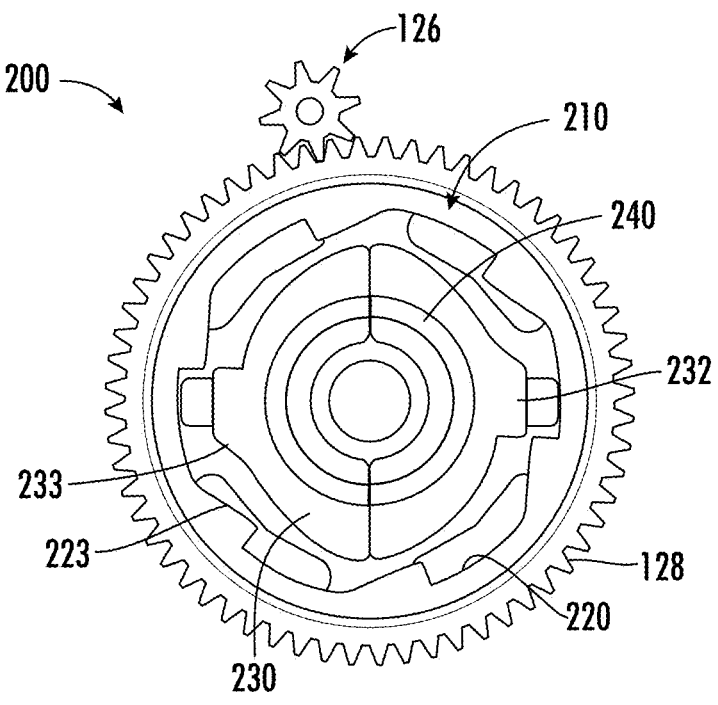
FIG. 5 is a simplified elevation view of a portion of the centrifugal clutch mechanism of the drive system of the lawnmower as viewed in a disengaged position in accordance with embodiments of the present disclosure.
Figure 6:
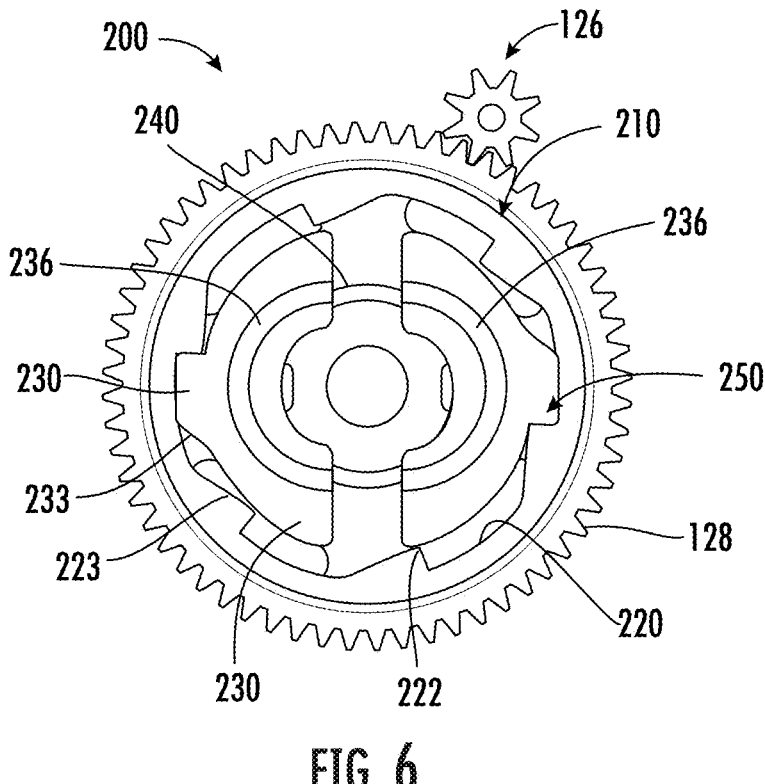
FIG. 6 is a simplified elevation view of a portion of the centrifugal clutch mechanism of the drive system of the lawnmower as viewed in an engaged position in accordance with embodiments of the present disclosure.

FIGS. 4-6 illustrate an embodiment of the centrifugal clutch mechanism 200. FIG. 4 illustrates an exploded perspective view of the centrifugal clutch mechanism 200. FIG. 5 illustrates a front view of the centrifugal clutch mechanism 200 in the disengaged state whereby the centrifugal clutch mechanism 200 does not transmit power from the first stage gear 128 to the second stage gear 130. FIG. 6 illustrates a front view of the centrifugal clutch mechanism 200 in the engaged state whereby the centrifugal clutch mechanism 200 transmits power from the first stage gear 128 to the second stage gear 130.

The centrifugal clutch mechanism 200 generally includes a clutch bell 210 and a plurality of centrifugal weights 230 that collectively cooperate to selectively transmit power through the centrifugal clutch mechanism 200 dependent on rotational speed of the first stage gear 128 as driven by the motor 112 (FIG. 2).

Figure 7A:
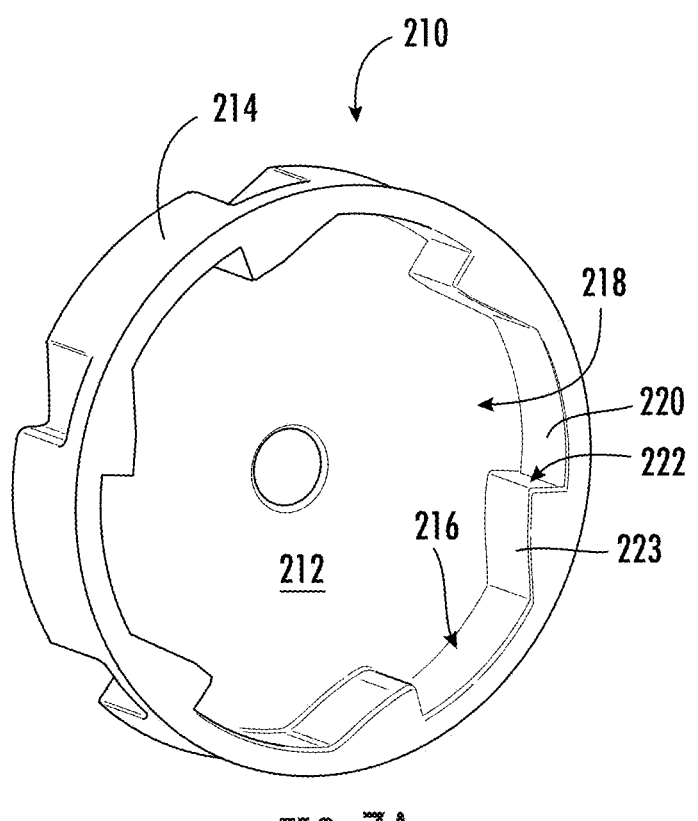
FIG. 7A is a right perspective view of a clutch bell in accordance with embodiments of the present disclosure.
Figure 7B:
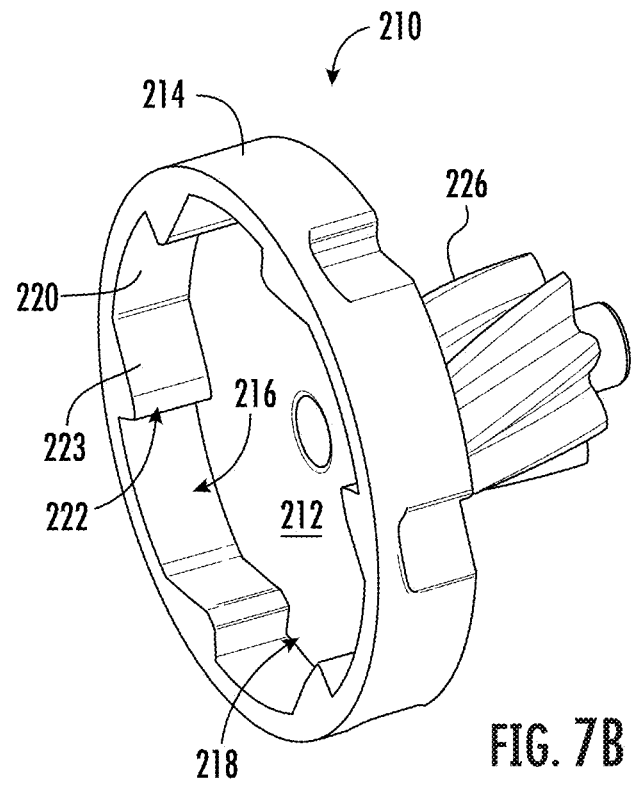
FIG. 7B is a left perspective vie of the clutch bell of FIG. 7A in accordance with embodiments of the present disclosure.

FIGS. 7A and 7B illustrate left and right respective views, respectively, of the clutch bell 210 illustrated in FIGS. 4-6. As illustrated, the clutch bell 210 generally includes an annular wall 212 and a circular ring 214 extending away from the annular wall 212. The annular wall 212 is a structure that extends out from a center axis in the radial direction R (FIG. 4). As appreciated herein, the annular wall 212 structurally connects the circular ring 214 to the second stage pinion 226. The annular wall 212 can thereby comprise any suitable configuration. For example, the annular wall 212 can comprise a substantially circular solid wall as illustrated in FIGS. 7A and 7B. Alternatively, in some embodiments, the annular wall 212 may comprise a webbed structure. In some embodiments, the annular wall 212 may comprise a plurality of spokes extending from the second stage pinion 226 to the circular ring 214.

The circular ring 214 of the clutch bell 210 extends away from the annular wall 212 in the axial direction A (i.e., towards the first stage gear 128 as illustrated in FIG. 4). By extending away from the annular wall 212, the circular ring 214 and the annular wall 212 define an internal cavity 218, i.e., the empty space partially enclosed by the circular ring 214 and the annular wall 212.

As illustrated in FIGS. 7A and 7B, the circular ring 214 extends away from the annular wall 212 at the outer circumference of the annular wall 212. However, it is appreciated that the circular ring 214 may extend away from the annular wall 212 at location between the center mass and the outer circumference of the annular wall 212. Further, as illustrated, the circular ring 214 comprises a complete ring shape that fully extends for the entire radial distance with no breaks or gaps. However, it is appreciated that the circular ring 214 may alternatively comprise a plurality of separated or partially separated projections that extend away from the annular wall 212, so long as the centrifugal weights 230 could not escape the centrifugal clutch mechanism 200 between potential gaps between said projections.

The circular ring 214 has an inward facing surface 216 that faces the internal cavity 218. The inward facing surface 216 defines a drive surface 220 that is configured to engage the centrifugal weights 230 when the centrifugal weights 230 are in the engaged position. As illustrated in FIGS. 5-7, the drive surface 220 can comprise one or more protrusions 222. The protrusions 222 can comprise a plurality of features distributed about the drive surface 220 that project inwards into the internal cavity 218. The drive surface 220 can comprise any number of protrusions that are symmetrically distributed (as illustrated) or asymmetrically distributed.

As illustrated in FIGS. 7A and 7B, in some embodiments, the protrusions 222 comprise a tapered ramp 223. As appreciated herein, and with additional reference to FIGS. 1 and 2, the tapered ramp 223 can facilitate rotation of the clutch bell 210 past the centrifugal weights 230 when the centrifugal weights 230 are in the engaged positions but when the wheels 108 spin at a rate exceeding that of the first stage gear 128. In other words, if the lawnmower is pushed or turned in an overdrive state, where the wheels 108 spin at a faster rate than that caused by the output of the motor 112, the tapered ramp 223 can facilitate temporary slippage of the centrifugal weights 230 past the drive surface.

As best illustrated in FIGS. 3B and 7B, the clutch bell 210 further comprises the second stage pinion 226. The second stage pinion 226 is configured to engage the second stage gear 130 for translating rotational movement therebetween. For instance, the second stage pinion 226 extends away from the annular wall 212 in the axial direction A, opposite from the circular ring 214. Thus, when the centrifugal weights 230 are in their engaged position (FIG. 6), the centrifugal clutch mechanism 200 translates power to the second stage gear 130 via the second stage pinion 226.

In some instances, the first stage gear 128 and clutch bell 210 of the centrifugal clutch mechanism 200 can be coplanar. That is, the first stage gear 128 and clutch bell 134 can lie along a same plane. In other instances, the first stage gear 128 and clutch bell 210 can lie along parallel offset planes. That is, the first stage gear 128 and clutch bell 210 can be parallel with one another but lie along different planes.

Figure 8A:
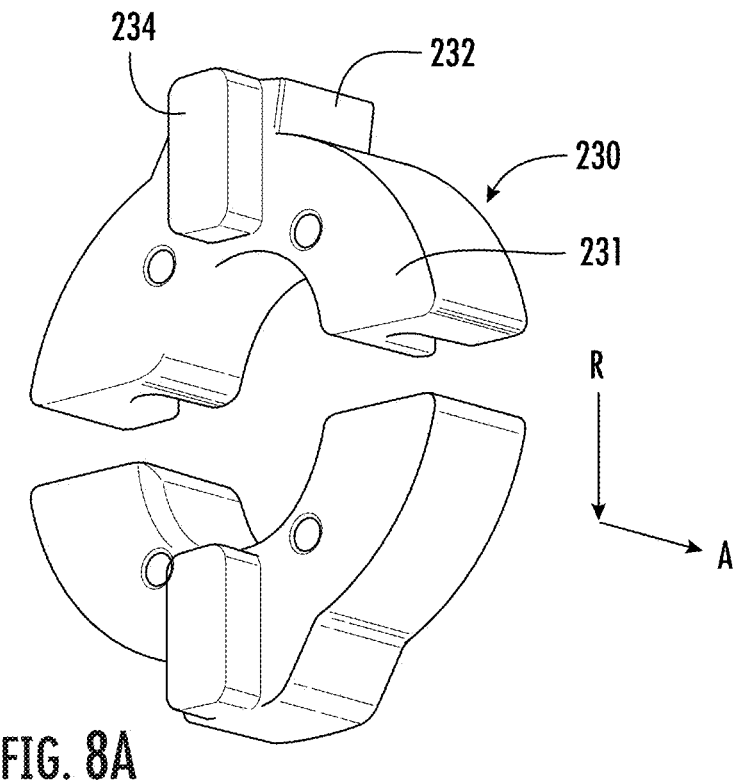
FIG. 8A is a right perspective view of centrifugal weights in accordance with embodiments of the present disclosure.
Figure 8B:
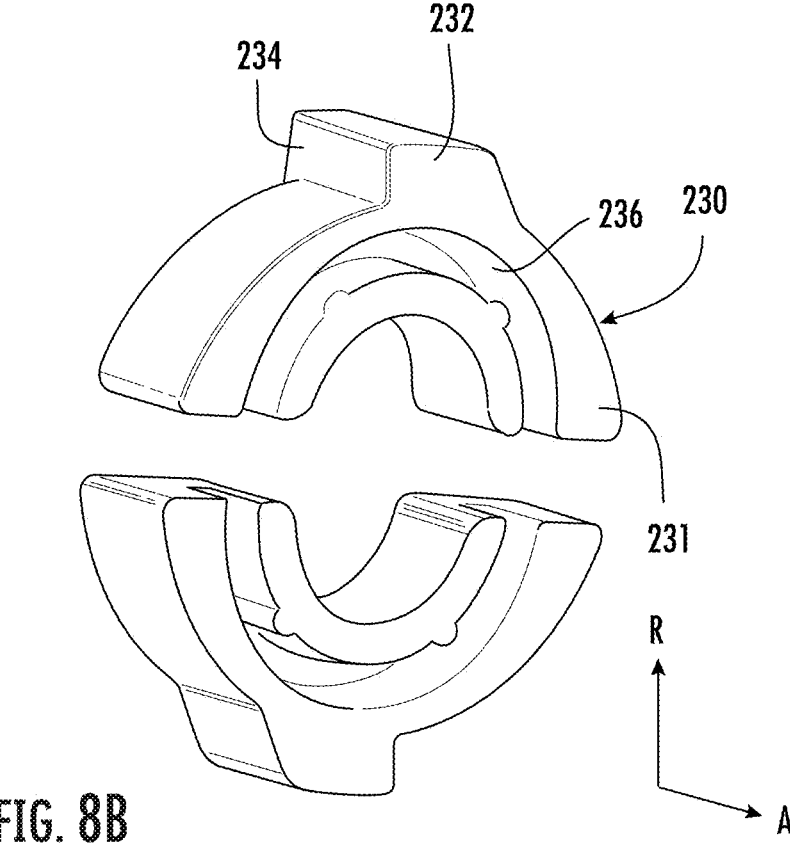
FIG. 8B is a left perspective vie of the centrifugal weights of FIG. 8A in accordance with embodiments of the present disclosure.

FIGS. 8A and 8B illustrate left and right respective views, respectively, of the centrifugal weights 230 illustrated in FIGS. 4-6. The centrifugal weights 230 are generally sized, shaped, and positioned to translate outwardly upon an application of centrifugal force so they become engaged with the drive surface 220 of the circular ring 214 of the clutch bell 210 (see FIG. 6). The centrifugal clutch mechanism 200 can comprise one or more centrifugal weights 230 that are translatable towards the drive surface 220. For instance, as illustrated in FIGS. 8A and 8B, two centrifugal weights 230 may be used.

The centrifugal weights 230 can share a common size. More particularly, the centrifugal weights 230 can have a common mass and a common moment of inertia. In this regard, the centrifugal weights 230 can rotate at the same, or approximately the same, speed when moving between engaged and disengaged positions. This can prevent wobble of the centrifugal clutch mechanism which might otherwise occur under eccentric loading conditions. In instances with more than two centrifugal weights 230, it may be possible to vary one or more aspects of opposite pairs of centrifugal weights 230, e.g., two centrifugal weights 230 can have a first same shape while another two centrifugal weights 230 disposed between the two centrifugal weights 230 can have a second shape different from the first shape.

The centrifugal weights 230 can each generally include a body 231 and a radial projection 232. The body 231 can comprise any suitable shape for being disposed in the internal cavity 218 of the clutch bell 210 (FIGS. 5-6). For instance, each centrifugal weight 230 may comprise an annular configuration (e.g., partial rings) as illustrated in FIGS. 8A and 8B. Such embodiments can facilitate the centrifugal weights to collectively form a ring or circle like configuration when in the disengaged state.

The centrifugal weights 230 include one or more radial projections 232 that extend away from the body 231 in the radial direction R. The radial projections 232 can also be referred to as clutch pawls and are generally configured to engage with the drive surface 220 of the clutch bell 210 when the centrifugal weights 230 are in the engaged position (FIG. 6). For instance, as illustrated in FIGS. 5 and 6, the radial projections 232 can be shaped to have a mating surface matching that of the protrusions 222 of the clutch bell 210.

In some embodiments, the radial projections may further comprise a tapered ramp 233. As appreciated herein, and with additional reference to FIGS. 1 and 2, the tapered ramp 233 of the radial projection can facilitate rotation of the clutch bell 210 past the centrifugal weights 230 when the centrifugal weights 230 are in the engaged positions but when the wheels 108 spin at a rate exceeding that of the first stage gear 128. In other words, if the lawnmower 100 is pushed or turned in an overdrive state, where the wheels 108 spin at a faster rate than that caused by the output of the motor 112, the tapered ramp 233 of the radial projections 232 can slide over the tapered ramp 223 of the protrusions 222 of the clutch bell 210 to facilitate temporary slippage of the centrifugal weights 230 past the drive surface 220 of the clutch bell 210.

Figure 9:
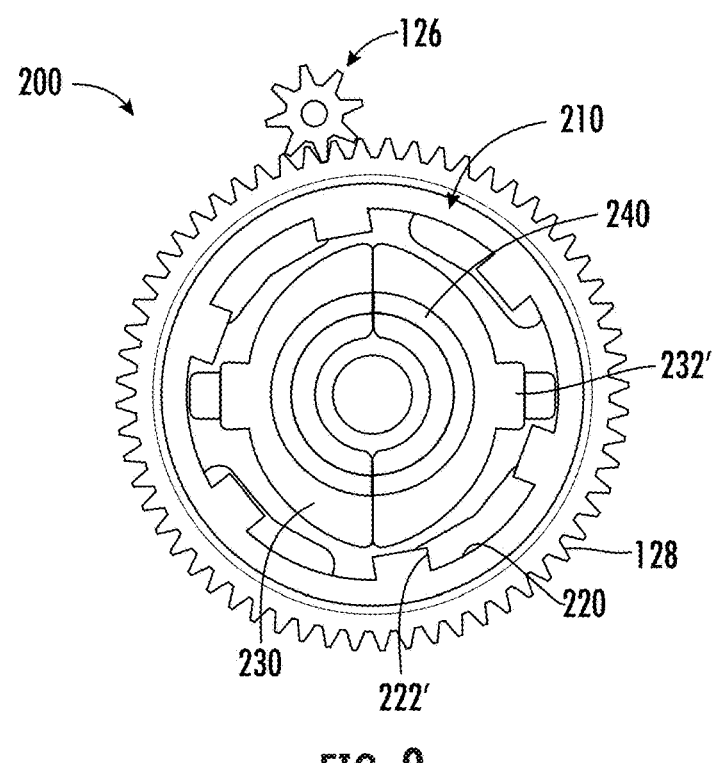
FIG. 9 is a simplified elevation view of a portion of another centrifugal clutch mechanism of the drive system of the lawnmower as viewed in a disengaged position in accordance with embodiments of the present disclosure.

We reference to FIG. 9, another configuration of the centrifugal weights 230 and clutch bell 210 are illustrated, with common element numbers illustrating the common components from the aforementioned examples. In some embodiments, such as that illustrated in FIG. 9, the centrifugal weights 230 may be able to drive the clutch bell 210 in either rotational direction. That is, the radial projections 232' can have a relatively flat surface on each side (as opposed to having a tapered ramp 233 as illustrated in FIG. 5) such that the radial projection 232' can engage the protrusions 222' from either side. Similarly, the protrusions 222' can also have a relatively flat surface on each side (as opposed to having a tapered ramp 223 as illustrated in FIG. 5) such that the protrusions 222' can receive the radial projection 232' from either side.

With reference back to FIG. 4, the centrifugal weights 230 are slidingly engaged with the first stage gear 128. Slidingly engaged refers to the centrifugal weights 230 being at least partly constrained by the first stage gear 128 but wherein each centrifugal weight can slide in at least one direction with respect to the first stage gear 128. For instance, the first stage gear 128 can include one or more axial projections 234 that extend away from the body 231 in the axial direction A and in the direction facing the first stage gear 128. As illustrated, the first stage gear 128 can include guide slots 129 that are complementary to the axial projections 234. In such embodiments, the axial projections 234 of the centrifugal weights 230 can be received in respective guide slots 129 of the first stage gear 128. Once received, the guide slots 129 guide the centrifugal weights 230 to slide inwardly or outwardly in the radial direction R dependent on the amount of centrifugal force applied on the centrifugal weights 230. For instance, the guide slots can be shaped as a linear slot extending in the radial direction from a centerline towards the periphery of the first stage gear 128.

To maintain the centrifugal clutch mechanism 200 in a disengaged state absent sufficient centrifugal force, the centrifugal clutch mechanism 200 can include one or more inward biasing elements 240. The inward biasing elements provide a force to the one or more centrifugal weights 230 to return them to the disengaged position (i.e., retracted towards the center of the internal cavity 218) such that they do not engage with the driving surface of the clutch bell 210.

As best illustrated in FIGS. 4-6 and 8B, the inward biasing element 240 can comprise a garter spring that pulls the centrifugal weights 230 towards one another (and away from the drive surface 220 of the clutch bell 210). For instance, the centrifugal weights 230 can include an annular groove 236, wherein the inward biasing element 240 (e.g., the garter spring as illustrated) is disposed in the annular grooves 236. Thus, as centrifugal force pushes the centrifugal weights 230 away from one another, the inward biasing element 240 will flex (e.g., stretch) in response to the movement but will continuously impart a biasing force on the centrifugal weights 230. Once the centrifugal force is removed, or at least reduced below a threshold, the inward biasing element 240 returns the centrifugal weights 230 to their native disengaged positions.

The inward biasing element 240 can be selected to have a biasing force (e.g., a spring constant) and size to affect disengagement of the centrifugal weights 230 at a desired low-speed threshold. For instance, inward biasing elements 240 with lower spring constants may remain engaged at lower low-speed thresholds while inward biasing elements 240 with higher spring constants may disengage at lower low-speed thresholds.

With collective reference to FIGS. 3-8, the drive system 116 and the centrifugal clutch mechanism 200 will now be described in operation.

As previously described, the first stage gear 128 can receive driving power from the motor 112, such as the prime mover of the lawnmower (FIG. 1). In the depicted embodiment, the first stage gear 128 is an input gear. The first stage gear 128 can be coupled to a shaft and rotatable about a central axis. The first stage gear 128 is rotated to rotatably drive the centrifugal clutch mechanism 200. More specifically, the first stage gear 128 can interface with the centrifugal weights 230 of the centrifugal clutch mechanism 200 to translate rotational movement, and thus centrifugal force, on the centrifugal weights 230.

At low operational speeds, e.g., below a low-speed threshold, the centrifugal weights 230 of the centrifugal clutch mechanism 200 remain in the disengaged position (inwardly retracted towards the center), such as a result of the biasing force from the inward biasing element 240. As the speed of the first stage gear 128 increases, the centrifugal weights 230, which rotate with the first stage gear 128, experience an increase in centrifugal force. As the centrifugal force passes a threshold that overcomes the biasing force from the inward biasing element, the centrifugal weights 230 slide outwardly toward the circular ring 214 of the clutch bell until they reach and engage with the drive surface 220 of the circular ring 214.

In certain instances, the centrifugal clutch mechanism 200 can rotate in a range of rotational speeds whereby the centrifugal weights 230 are not fully retracted by the inward biasing element 240 but the centrifugal weights 230 are also not in the engaged position. This may be referred to as an intermediate period where the centrifugal weights 230 are moving from the disengaged position to the engaged position. As the speed of rotation increases to the low-speed threshold, the centrifugal weights 230 can move to the engaged position as shown in FIG. 6.

In some embodiments, the centrifugal clutch mechanism 200 can be configured such that the centrifugal weights 230 move at least 5 percent of the radial distance as measured between the disengaged and engaged positions, such as at least 10 percent of the radial distance as measured between the disengaged and engaged positions, such as at least 20 percent of the radial distance as measured between the disengaged and engaged positions, such as at least 30 percent of the radial distance as measured between the disengaged and engaged positions, such as at least 40 percent of the radial distance as measured between the disengaged and engaged positions, such as at least 50 percent of the radial distance as measured between the disengaged and engaged positions.

When the centrifugal weights 230 are in the engaged position, the centrifugal clutch mechanism 200 can transmit power from the first stage gear 128 to the second stage gear 130. For instance, as depicted, the radial projection 232 of each centrifugal weight 230 is in contact with a respective protrusion 222 of the drive surface 220 of the clutch bell 210 when the centrifugal weights 230 are in the engaged position. In this state, each of the centrifugal weights 230 is compressed between the drive surface 220 of the clutch bell 210 such that each centrifugal weight 142 acts like a fixed power transmission member for transmitting power from the first stage gear 128 to the clutch bell 210. The clutch bell 210, in turn, has a second stage pinion 226 that engages with the second stage gear 130 such that rotation of the clutch bell 210 is transferred to the second stage gear 130 when the centrifugal weights 230 are in the engaged position and forcing rotation on the clutch bell 210.

The centrifugal weights 230 can remain in the engaged position as the first stage gear 128 rotates above the low-speed threshold. However, as the rotation of the first stage gear 128 decreases to a speed below the low-speed threshold, the biasing force of the inward biasing element 240 will eventually exceed the centrifugal force experienced by the centrifugal weights 230, so that the inward biasing element forces the centrifugal weights to transition from the engaged position (FIG. 6) to the disengaged position (FIG. 5). Thus, once the first stage gear 128 rotates under a certain rotational speed, the centrifugal weights 142 can return inwards within the internal cavity 218 of the clutch bell 210 so they no longer contact or engage the drive surface 220 of the circular ring 214.

Figure 10:
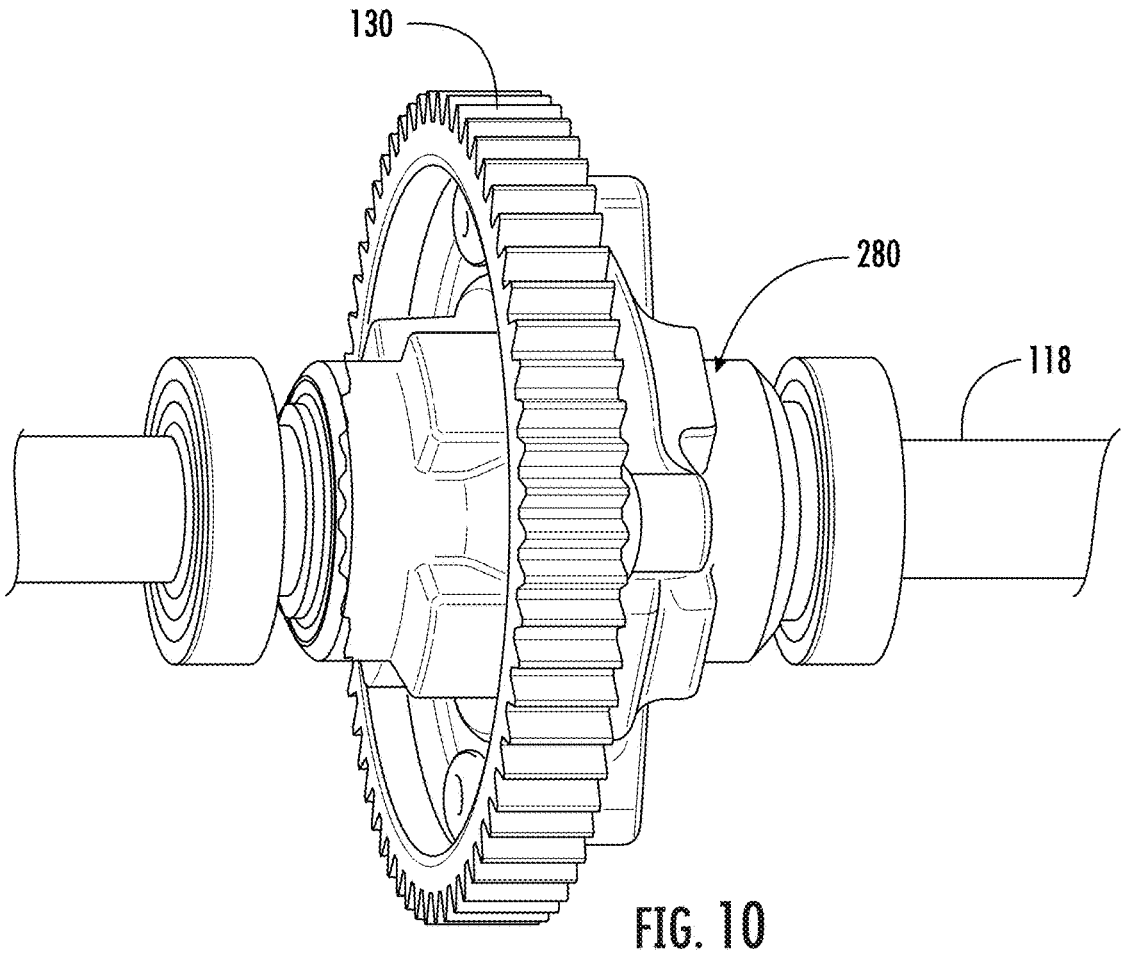
FIG. 10 is a perspective view of part of a second stage gear and a differential of the lawnmower in accordance with embodiments of the present disclosure.

As illustrated in FIG. 10, the second stage gear 130 is subsequently engaged with the axle 118 to translate rotational movement therebetween. Any suitable connection may be realized to allow for rotation of the second stage gear 130 to rotate the axle 118 which, directly or indirectly, rotates the wheels 108 (FIG. 2). In some embodiments, the second stage gear 130 may be directly mounted to the axle 118 such as wherein the axle 118 passes through a center hole in the second stage gear 130 with a fixed connection therebetween. In other embodiments, such as that illustrated in FIG. 10, one or more supplemental drive train features may also be implemented. For instance, a differential 280 may be incorporated. The differential can include a plurality of drive shafts wherein in combination, the differential 280 allows one or more wheels to rotate at different speeds (e.g., faster) than the others. Such embodiments can provide for an outer wheel 108 to rotate faster than an inner wheel 108 when turning the lawnmower 100 (FIG. 1).

Further aspects of the invention are provided by one or more of the following clauses:

A transmission comprising a first stage gear; a second stage gear; a centrifugal clutch mechanism that transfers energy from the first stage gear to the second stage gear, the centrifugal clutch mechanism comprising a clutch bell comprising an annular wall and a circular ring extending away from the annular wall towards the first stage gear to define an internal cavity, wherein the circular ring comprises an inward facing surface defining a drive surface; and one or more centrifugal weights disposed in the internal cavity between the annular wall and the first stage gear, wherein the one or more centrifugal weights are slidingly engaged with the first stage gear; wherein the second stage gear is rotatably coupled to the clutch bell; and wherein rotation of the first stage gear causes the one or more centrifugal weights to transition from a disengaged position in which the one or more centrifugal weights do not interface with drive surface to an engaged position in which the one or more centrifugal weights interface with the drive surface to transfer rotational energy from the first stage gear to the second stage gear.

The transmission of any one or more of the embodiments, wherein the drive surface comprises one or more protrusions projecting inwards into the internal cavity.

The transmission of any one or more of the embodiments, wherein the one or more protrusions each comprise a tapered ramp.

The transmission of any one or more of the embodiments, wherein at least one of the one or more centrifugal weights comprises a radial projection extending towards the annular wall, and wherein the radial projection engages the one or more protrusions when the one or more centrifugal weights are in the engaged position.

The transmission of any one or more of the embodiments, wherein at least one of the one or more centrifugal weights comprises an axial projection extending towards the first stage gear.

The transmission of any one or more of the embodiments, wherein the first stage gear comprises a guide slot that receives the axial projection of the one or more centrifugal weights.

The transmission of any one or more of the embodiments, wherein the one or more centrifugal weights comprises a plurality of centrifugal weights symmetrically distributed in the internal cavity.

The transmission of any one or more of the embodiments, further comprising an inward biasing element configured to provide a biasing force on the one or more centrifugal weights to return them to the disengaged position.

The transmission of any one or more of the embodiments, wherein the one or more centrifugal weights comprise an annular groove, and wherein the inward biasing element comprises a garter spring disposed in the annular groove.

A centrifugal clutch mechanism comprising a clutch bell comprising an annular wall and a circular ring extending away from the annular wall to define an internal cavity, wherein the circular ring comprises an inward facing surface defining a drive surface; a plurality of centrifugal weights disposed in the internal cavity; and an inward biasing element engaged with the centrifugal weights, wherein the inward biasing element biases the centrifugal weights towards a disengaged position in which the centrifugal weights do not interface with drive surface, and wherein upon application of a sufficient centrifugal force, the centrifugal weights are configured to transition to an engaged position in which the centrifugal weights interface with the drive surface.

The centrifugal clutch mechanism of any one or more of the embodiments, wherein the drive surface comprises one or more protrusions projecting inwards into the internal cavity, wherein at least one of the plurality of centrifugal weights comprises a radial projection extending towards the annular wall, and wherein the radial projection engages the one or more protrusions when the plurality of centrifugal weights are in the engaged position.

The centrifugal clutch mechanism of any one or more of the embodiments, wherein at least one of the plurality of centrifugal weights comprises an axial projection extending away from the clutch bell.

The centrifugal clutch mechanism of any one or more of the embodiments, further comprising an inward biasing element configured to provide a biasing force on the plurality of centrifugal weights to return them to the disengaged position.

A lawnmower comprising a motor; a first stage gear operably coupled to the motor; a second stage gear; a plurality of wheels operably coupled to the second stage gear via an axle; and a centrifugal clutch mechanism that transfers energy from the first stage gear to the second stage gear, the centrifugal clutch mechanism comprising a clutch bell comprising an annular wall and a circular ring extending away from the annular wall towards the first stage gear to define an internal cavity, wherein the circular ring comprises an inward facing surface defining a drive surface; and one or more centrifugal weights disposed in the internal cavity between the annular wall and the first stage gear, wherein the one or more centrifugal weights are slidingly engaged with the first stage gear; wherein the second stage gear is rotatably coupled to the clutch bell; and wherein rotation of the first stage gear by the motor causes the one or more centrifugal weights to transition from a disengaged position in which the one or more centrifugal weights do not interface with drive surface to an engaged position in which the one or more centrifugal weights interface with the drive surface to transfer rotational energy from the first stage gear to the second stage gear.

The lawnmower of any one or more of the embodiments, wherein the drive surface comprises one or more protrusions projecting inwards into the internal cavity, wherein at least one of the one or more centrifugal weights comprises a radial projection extending towards the annular wall, and wherein the radial projection engages the one or more protrusions when the one or more centrifugal weights are in the engaged position.

The lawnmower of any one or more of the embodiments, wherein at least one of the one or more centrifugal weights comprises an axial projection extending towards the first stage gear, and wherein the first stage gear comprises a guide slot that receives the axial projection of the one or more centrifugal weights.

The lawnmower of any one or more of the embodiments, wherein the one or more centrifugal weights comprises a plurality of centrifugal weights symmetrically distributed in the internal cavity.

The lawnmower of any one or more of the embodiments, further comprising an inward biasing element configured to provide a biasing force on the one or more centrifugal weights to return them to the disengaged position.

The lawnmower of any one or more of the embodiments, wherein the one or more centrifugal weights comprise an annular groove, and wherein the inward biasing element comprises a garter spring disposed in the annular groove.

The lawnmower of any one or more of the embodiments, further comprising a differential transmission operably coupled to at least one wheel between the at least one wheel and the second stage gear.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A transmission comprising:
a first stage gear;
a second stage gear; and
a centrifugal clutch mechanism that transfers energy from the first stage gear to the second stage gear, the centrifugal clutch mechanism comprising
    one or more centrifugal weights slidingly engaged with the first stage gear, the one or more centrifugal weights being linearly slidable along a radial direction perpendicular to a center axis of the centrifugal clutch mechanism,
    wherein rotation of the first stage gear causes the one or more centrifugal weights to transition along the radial direction from a disengaged position in which the one or more centrifugal weights are rotatably disengaged from the second stage gear to an engaged position in which the one or more centrifugal weights are rotatably engaged with the second stage gear to transfer rotational energy from the first stage gear to the second stage gear, and
    wherein at least one of the one or more centrifugal weights comprises an axial projection extending towards the first stage gear.

2. The transmission of claim 1, further comprising a drive surface extending annularly about the one or more centrifugal weights and defining an internal cavity within which the one or more centrifugal weights are disposed, wherein the drive surface comprises one or more protrusions projecting inwards into the internal cavity.

3. The transmission of claim 2, wherein the one or more protrusions each comprise a tapered ramp.

4. The transmission of claim 2, wherein at least one of the one or more centrifugal weights comprises a radial projection extending towards the drive surface, and wherein the radial projection engages the one or more protrusions when the one or more centrifugal weights are in the engaged position.

5. The transmission of claim 2, wherein the one or more centrifugal weights comprises a plurality of centrifugal weights symmetrically distributed in the internal cavity.

6. The transmission of claim 1, wherein the first stage gear comprises a guide slot that receives the axial projection of the one or more centrifugal weights.

7. The transmission of claim 1, further comprising an inward biasing element configured to provide a biasing force on the one or more centrifugal weights to return them to the disengaged position.

8. The transmission of claim 7, wherein the one or more centrifugal weights comprise an annular groove, and wherein the inward biasing element comprises a garter spring disposed in the annular groove.

9. A centrifugal clutch in selective mechanical communication between a first gear assembly and a second gear assembly to transfer energy from the first gear assembly to the second gear assembly, the centrifugal clutch comprising:

a plurality of centrifugal weights linearly slidable along a radial direction perpendicular to a center axis of the centrifugal clutch; and
    an inward biasing element engaged with the centrifugal weights,
    wherein one or more centrifugal weights of the plurality of centrifugal weights comprise an annular groove,
    wherein the inward biasing element comprises a garter spring disposed in the annular groove,
    wherein the inward biasing element biases the centrifugal weights towards a disengaged position in which the centrifugal weights are rotatably disengaged from the second gear assembly, and
    wherein, upon application of a sufficient centrifugal force, the centrifugal weights are configured to transition along the radial direction to an engaged position in which the centrifugal weights are rotatably engaged with the second gear assembly.

10. The centrifugal clutch of claim 9, further comprising a drive surface extending annularly about the plurality of centrifugal weights and defining an internal cavity within which the plurality of centrifugal weights is disposed, wherein the drive surface comprises one or more protrusions projecting inwards into the internal cavity.

11. The centrifugal clutch of claim 9, wherein at least one centrifugal weight of the centrifugal weights comprises an axial projection extending towards the first gear assembly.

12. A walk-behind power tool comprising:
a motor;
a first stage gear operably coupled to the motor;
a second stage gear;
a plurality of wheels operably coupled to the second stage gear via an axle;
a centrifugal clutch mechanism that transfers energy from the first stage gear to the second stage gear, the centrifugal clutch mechanism comprising
    one or more centrifugal weights slidingly engaged with the first stage gear, the one or more centrifugal weights being linearly slidable along a radial direction perpendicular to a center axis of the centrifugal clutch mechanism; and
a differential transmission operably coupled to at least one wheel, the differential transmission being disposed between the at least one wheel of the plurality of wheels and the second stage gear,
wherein rotation of the first stage gear by the motor causes the one or more centrifugal weights to transition along the radial direction from a disengaged position in which the one or more centrifugal weights are rotatably disengaged from the second stage gear to an engaged position in which the one or more centrifugal weights are rotatably engaged with the second stage gear to transfer rotational energy from the first stage gear to the second stage gear.

13. The walk-behind power tool of claim 12, further comprising a drive surface extending annularly about the one or more centrifugal weights and defining an internal cavity within which the one or more centrifugal weights are disposed, wherein the drive surface comprises one or more protrusions projecting inwards into the internal cavity, wherein at least one of the one or more centrifugal weights comprises a radial projection extending towards the drive surface, and wherein the radial projection engages the one or more protrusions when the one or more centrifugal weights are in the engaged position.

14. The walk-behind power tool of claim 12, wherein at least one of the one or more centrifugal weights comprises an axial projection extending towards the first stage gear, and wherein the first stage gear comprises a guide slot that receives the axial projection of the one or more centrifugal weights.

15. The walk-behind power tool of claim 12, further comprising a drive surface extending annularly about the one or more centrifugal weights and defining an internal cavity within which the one or more centrifugal weights are disposed, wherein the one or more centrifugal weights comprises a plurality of centrifugal weights symmetrically distributed in the internal cavity.

16. The walk-behind power tool of claim 12, further comprising an inward biasing element configured to provide a biasing force on the one or more centrifugal weights to return them to the disengaged position.

17. The walk-behind power tool of claim 16, wherein the one or more centrifugal weights comprise an annular groove, and wherein the inward biasing element comprises a garter spring disposed in the annular groove.

* * * * *